A. T. MALTBY.
RESILIENT WHEEL FOR VEHICLES.
APPLICATION FILED FEB. 21, 1918.
1,415,888.
Patented May 16, 1922.
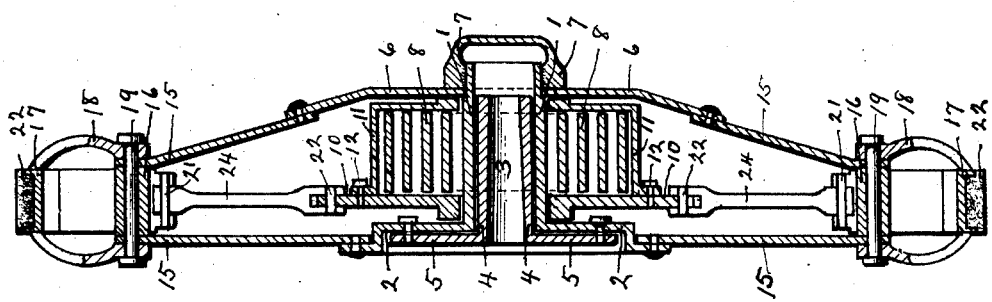
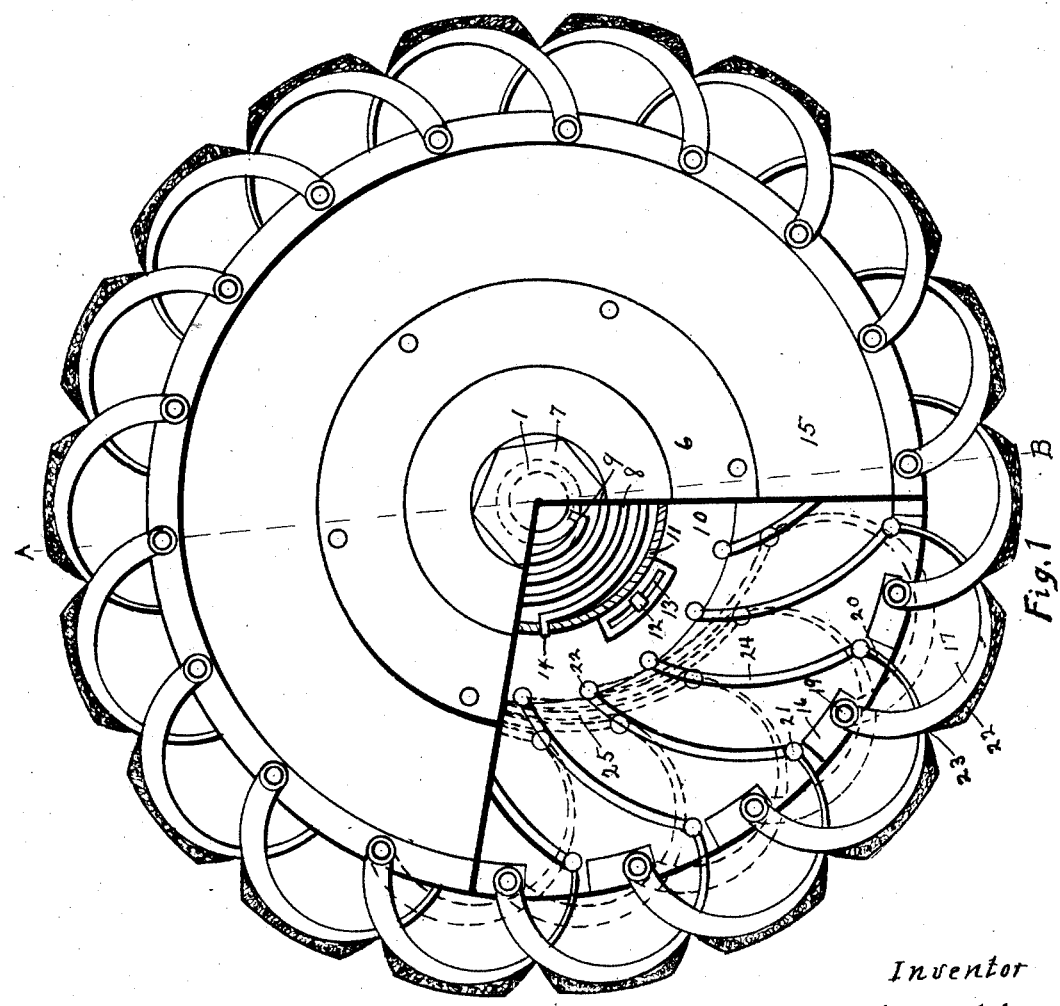
Inventor
Arthur T Maltby

UNITED STATES PATENT OFFICE.

ARTHUR T. MALTBY, OF CHICAGO, ILLINOIS.

RESILIENT WHEEL FOR VEHICLES.

1,415,888.   Specification of Letters Patent.   Patented May 16, 1922.

Application filed February 21, 1918. Serial No. 218,470.

*To all whom it may concern:*

Be it known that I, ARTHUR T. MALTBY, a citizen of the United States, and a resident of Chicago, in the county of Cook and State of Illinois, have invented certain new and useful Improvements in Resilient Wheels for Vehicles, of which the following is a specification.

My invention relates to improvements in resilient wheels for vehicles in which a central hub member supports rigid intermediate members in lieu of spokes, and a rigid wheel rim, around which a plurality of curved, outwardly projecting tread members are mounted at spaced intervals forming a collapsible outer tread surface circumferentially surrounding said wheel rim, one end of each of said tread members pivotally secured to said wheel rim, their intermediate portions projecting outwardly to form said outer tread surface, and their opposite or movable ends returning to and passing through said wheel rim, and held in operative resilient relation to said rim by a metallic spring spirally disposed around said central hub member, and having one end secured thereto, the other, or movable end of said spring connected to the said movable ends of said tread members through a rotating circular disk and connecting rods, all operating and connected together in such manner and relation that any inward or collapsing movement of said outer tread members will impart rotary motion to said disk and thereby oppose the tension of said spring against said movement, and the object of the invention is, first, to provide a resilient wheel which may be manufactured in standard sizes to be mounted on the axles of vehicles; second, to provide a resilient wheel that may be demountably secured to a separate independent inner hub, or to the hub of vehicle wheels already in use; third, to provide a resilient wheel having a collapsible outer tread surface, the various members of which are all controlled, resiliently, by a single centrally located spring; fourth, to provide a resilient wheel in which the tension of a spring resiliently controlling a collapsible outer tread surface may be conveniently adjusted to conform to various operative conditions; fifth, to provide a resilient wheel of light but simple and durable construction in which the parts subject to wear are conveniently accessible.

These objects I accomplish by providing a central hub member having a central opening arranged either to receive the axle of a wheel direct, or to fit over and be secured to a separate independent inner hub, the inner end (nearest the vehicle) of said central hub member is also provided with an integral outwardly projecting flange adapted to support the inner one of a pair of circular side members, in lieu of spokes, and said flange is also adapted to be bolted to the flange of a separate independent inner hub for conveniently demounting the wheel. By providing a separate removable flange fitted to the outer end of said hub member, with means for holding it in rigid relation thereto, said movable flange adapted to support the other or outer side member, the removal of said flange permitting convenient access to the aforesaid spring and other moving parts. By providing a single comparatively long spiral spring coiled around said central hub member, between the aforesaid flanges, said spring having its inner end secured to said central hub member, the outer or movable end connected to a rotary disk, said disk consisting of a circular disk or flange, with a central opening to fit over and revolve around said hub member, said rotary disk provided with holes at spaced apart intervals around the periphery thereof for connection with the aforesaid connecting rods. By providing circular spaced apart side members, in lieu of spokes, the outer periphery of said side members connected together with spacing pieces, interposed between, and forming a rigid wheel rim. By providing a collapsible outer tread surface circumferentially surrounding said wheel rim said outer tread surface consisting of a plurality of curved outwardly projecting tread members having one end divided so as to straddle the wheel rim, and pivotally connected thereto, the opposite or movable ends of said tread members passing between the arms of the divided portion of the next succeeding tread member and between the spaced apart side members to a connection with the aforesaid connecting rods. By providing connecting rods, properly curved, and connecting them, one end to the movable end of each of said tread members, and the opposite ends in sequence around the outer periphery of the said rotary disk, in such manner as to hold the said tread members and the said rotary disk in such relation one with the other, that any inward or collapsing movement of any of said outer tread members will cause the rotary disk to rotate around the aforesaid hub member and thereby oppose the tension of said spring against such movement. By providing one or more slots in said rotary disk permitting said spring connection therewith to be moved forward or back from a neutral position thereby changing the tension of said spring in relation to said rotary disk and said tread members.

The outer tread surface to be provided with suitable rubber pads covering the wearing surface of said tread members.

The invention is illustrated by the accompanying drawing in which Figure 1 is a side elevation with a portion of a side member removed showing a portion of the interior. Figure 2 is a cross section of the wheel on the line A—B.

Referring to the drawing the numerals indicate the various parts throughout the various views.

The central hub member, 1—1—1, is a cylindrical shell, having at its inner end (toward the vehicle) an integral outwardly extending flange 2, adapted to support the inner side member 15, the opening through the axis of the hub member adapted either to form a bearing directly with the axle of a vehicle, or arranged to fit over a separate independent inner hub 4, and keyed thereto, or preferably bolted through the aforesaid flange 2, to a corresponding flange 5, on said separate hub. The outer end of said central hub member is arranged with a shoulder to receive a removable disk flange 6, said flange having an outside diameter sufficient to provide an opening through the outer side member large enough to assemble the aforesaid spiral spring and rotary disk, and arranged to support said outer side member 15, and said central hub member is also extended beyond said outer flange and said extension provided with a thread and nut 7, to hold said flange firmly in place and impart a suitable finished appearance. The middle portion of said hub member, between the said flanges, is arranged to receive the aforesaid spring and rotary disk.

The spring 8, is preferably of rectangular section, wound spirally around the said hub member, and having its inner end 9, demountably secured to said hub member, preferably by a hook, or by holes through said spring fitting over suitable projections on said hub member, the outer or movable end of said spring being connected to the rotary disk.

The rotary disk 10—10, is located between said spring and said inner flange, centering on the wheel tread, and consists preferably of a circular disk or flange, having a central opening to fit over the said hub member, and permit rotary motion around the same, and steel ball or roller bearings may also be provided for facilitating said rotary motion. The outer periphery of said rotary disk is provided with holes or otherwise arranged to receive connection at spaced intervals with connecting rods, and at an intermediate point of said disk, means are provided for connecting to the movable end of said spiral spring. A branch or fork 11 of said rotary disk extends horizontally across the outer periphery of said spirally coiled spring, to the aforesaid outer flange, and thence, inside of and between said outer flange and the outer edge of said spring, to the hub member, around which it is arranged to revolve in unison with said rotary disk, to which it is secured by a flange and bolts 12, said bolts working in slots 13, provided in said rotary disk or branch disk, to provide for adjusting the spring tension, said spring being attached preferably by a hook 14, or holes through said spring and secured by bolts to said branch rotary disk, said branch rotary disk being preferably formed so as to completely enclose said spring.

The side members 15—15, in lieu of spokes, are circular metal disks with central openings to fit their respective flanges, to which they are secured by rivets or bolts, and they may be formed with ribs to represent spokes, or panels cut out for the same effect. The outer periphery of said side members form the rigid wheel rim and are joined together, with spacing pieces 16 interposed between to provide the necessary space to permit motion of the outer tread members between them.

The outer tread surface consists of a plurality of outwardly projecting curved tread members 17, each forming a part or segment of a collapsible outer tread surface circumferentially surrounding the said wheel rim. Each of said tread members is divided at one end so as to pass outside of, and on each side of said wheel rim and pivotally secured thereto by a bolt 19, or pin, passing through the two arms of said tread members and through the wheel rim. The spacing pieces in said wheel rim may be provided with removable sleeves for conveniently renewing the wearing surface around said bolts or pins. The intermediate portion of said outer tread members projects outwardly far enough from the rigid wheel rim to provide for the required movement and resilience, the movable ends 20, bending back to and passing through the wheel rim between the two side members, the said movable ends provided with a pivotal joint for connecting rod connections 21.

The outer tread members are of rigid channel section the flanges extending outwardly for strength and convenience for holding rubber pads 22, and the general form and shape of said tread members is such that they will avoid the spacing pieces in the wheel rim, during inward motion until fully collapsed. The said tread members are mounted upon the said rigid wheel rim at spaced intervals in such manner that the movable end of each member will overlap and extend beyond the wheel rim joint of each succeeding member, the divided portion of said tread members providing the necessary space to permit the movable end of the preceding member to pass as indicated at 23 between the two arms 18, of said tread members, and thence between the side members of the wheel rim.

Rigid connecting rods 24 are pivotally connected, one end 21 to the movable end of each of said tread members, and the opposite ends 26 connected in sequence around the outer periphery of said rotary disk, thus providing a flexible connection between said spring and the movable end of said tread members. The two opposite end connections of said connecting rods are so arranged in relation one to the other that when an outer tread member is forced inward, or collapsed, it will impart rotary motion to said rotary disk, thereby opposing the tension of said spring against such collapsing motion, and said connecting rods 24 are curved in their length so that they will fold, one upon the other, as indicated at 25, thus permitting the maximum distance of travel in connection with said rotary disk and occupying a minimum of space when the tread members are fully collapsed. (Dotted lines show the tread members fully collapsed.)

It will be seen that by dividing one end of each tread member into two arms, said arms passing outside of and pivotally connected, one on each side, to the rigid wheel rim provides a rigid construction in resisting side thrust and preserving the alignment of said tread members in relation to said wheel rim, and spreading said arms also serves to protect the balance of the wheel, at the same time facilitating turning out of deep ruts in a road, over railway tracks, etc.

It will also be seen that the curved semicircular form of the tread members, permits the greatest distance of collapsing motion with the shortest length from end to end, consistent with the requirements of resiliency, and the shorter radius of travel of said tread members also facilitates the imparting of rotary motion to the rotary disk while mounting the tread members on the wheel rim so they will overlap each other, their movable ends passing between the arms of each succeeding member, permits the shortest distance between centers of said tread members, thereby offering more points of tread contact for a given size wheel, and the least area of depressed space between said points of contact, the form of construction rendering these negligible, while passing the movable ends of said tread members between the side members of the wheel rim further preserves the alignment, and the intermediate curved portion offers an equal bearing surface at all points or degree of collapse or inward movement of the outer tread members.

It will also be seen that under normal conditions the wheel load carried by the tread members is distributed between the spring and the wheel rim in approximately equal proportions but as the tread members are pressed inward, or collapsed, the bearing surface or point of road contact changes, moving nearer to the pivoted rim connection, thereby increasing the leverage and power of the spring to resist inward motion or collapse of the tread members, thus tending to prevent entire collapse or pounding of the tread members against the wheel rim.

It will also be seen that the connecting rods are arranged to connect all the tread members consecutively to the rotary disk and to maintain the relative position between the movable ends of said tread members, and their respective points of connection to the periphery of said rotary disk, said points of connection on the rotary disk being such that both connections move in the same general direction and the collapsing motion of the tread members is transmitted to the rotary disk in such manner as to cause said rotary disk to rotate with a minimum of friction loss, and that by properly curving said connecting rods throughout their length, said connecting rods will fold one upon another in such manner as to occupy a minimum of space when said tread members are fully collapsed.

It will also be seen that by the use of a spiral spring surrounding the central hub member, a comparatively long spring can be used, and selected of such length and thickness for a given condition that the definitely restricted motion transmitted from the outer tread members will be well within the operative elastic limits of said spring, while the facilities for adjustment is of very material advantage in its practical operation in the wheel.

What I claim is:

1. The combination in a resilient wheel, for vehicles, of a central hub member, adapted to be mounted on the axle of a vehicle, and having two annular spaced part flanges said flanges arranged to support two spaced part circular side members, in lieu of spokes, the outer peripheries of said side members fastened together, with spacing pieces interposed between, and forming a rigid wheel rim with openings to the interior of said wheel between said side members, a collapsible outer tread surface circumferentially surrounding said wheel rim, said collapsible tread surface consisting of a plurality of curved, outwardly projecting tread members, each of said tread members having one end divided into two arms and pivotally secured to said wheel rim, the opposite or movable end overlapping and passing between the said arms of the next succeeding member, and through said wheel rim between said side members, the intermediate portion of said tread members projecting outwardly from said wheel rim to form said outer tread surface, and cushioning means for holding the said tread members in operative resilient relation to said wheel rim, said means consisting of a metallic spring coiled spirally around said central hub member, the inner end of said spring demountably secured to said central hub member, the outer, movable end of said spring connected to a circular rotary disk, said rotary disk arranged to have rotary motion around said central hub member and also arranged for adjusting or changing the tension of said spring, and a plurality of connecting rods, each having one end connected to the movable end of one of said tread members and their opposite ends all connected consecutively around the periphery of said circular rotary disk in such manner and relation that any inward or collapsing movement of any one or more of said tread members will impart rotary motion to said rotary disk, thereby opposing the tension of said spring against said movement substantially as set forth.

2. The combination in a resilient wheel, for vehicles, of a central hub member arranged to be demountably secured to a separate independent inner hub, and having two annular spaced apart flanges, said flanges arranged to support two spaced apart circular side members, in lieu of spokes, the outer periphery of said side members fastened together, with spacing pieces interposed between, and forming a rigid wheel rim with openings to the interior of said wheel between said side members, a collapsible outer tread surface circumferentially surrounding said wheel rim said collapsible tread surface consisting of a plurality of curved, outwardly projecting tread members, each of said tread members having one end divided into two arms and pivotally secured to said wheel rim, the opposite or movable end overlapping and passing between the said arms of the next succeeding tread member and through said wheel rim between said side members, the intermediate portion of said tread members projecting outwardly from said wheel rim to form said outer tread surface, and cushioning means for holding the said tread members in operative resilient relation to said wheel rim, said means consisting of a metallic spring coiled spirally around said central hub member, the inner end of said spring demountably secured to said central hub member, the outer or movable end of said spring connected to a circular rotary disk, said rotary disk arranged to have rotary motion around said central hub member, and also arranged for adjusting or changing the tension of said spring, and a plurality of connecting rods each having one end pivotally connected to the movable end of one of said tread members, and their opposite ends all connected consecutively around the periphery of said circular rotary disk in such manner and relation that any inward, or collapsing movement of one or more of said tread members will impart rotary motion to said rotary disk, thereby opposing the tension of said spring against said movement substantially as set forth.

3. In a device of the type specified, a wheel body, including a central hub member adapted to be mounted on the axle of a vehicle, a rigid wheel rim, rigid supporting members between said central hub member and said wheel rim, said wheel body having a collapsible outer tread surface circumferentially surrounding said wheel rim, said outer tread surface consisting of a plurality of curved, outwardly projecting tread members, each of said tread members having one end pivotally secured to said rigid wheel rim, the intermediate portion of said tread members projecting outwardly to form said collapsible outer tread surface, the opposite or movable ends of said tread members turning inwardly to and passing through said wheel rim, in combination with a metallic spring spirally disposed around said central hub member, one end of said spring secured to said central hub member, and the opposite or movable end of said spring secured to a circular rotary disk said disk mounted upon and arranged to have rotary motion around said central hub member, and a plurality of connecting rods each having one end pivotally connected to the movable end of one of said tread members and the opposite ends of said connecting rods pivotally connected consecutively around the periphery of said rotary disk in such manner and relation that any inward or collapsing movement of one or more of said outer tread members will impart rotary motion to said rotary disk and thereby oppose the tension of said spring against said movement.

4. In a device of the type specified, a wheel body, including a central hub member adapted to be mounted on the axle of a vehicle, a rigid wheel rim, rigid supporting members between said hub member and said wheel rim, and a collapsible outer tread surface circumferentially surrounding said wheel rim, having in combination therewith a metallic spring spirally disposed around said central hub member one end of said spring secured to said central hub member, the opposite or movable end connected to a rotary disk said rotary disk mounted upon and arranged to have rotary motion around said central hub member and means for adjusting the tension of said spring, said means including a branch of said rotary disk, said branch disk provided with a slotted flange the movable end of said spring connected to said branch disk, said branch disk secured to said rotary disk by bolts, said bolts passing through the slotted flange of said branch disk in such manner that the movable end of said spring can be adjusted forward or back from a normal position in relation to said rotary disk, and connecting rods interposed between said rotary disk and said collapsible outer tread surface, in such manner and relation that any inward or collapsing movement of said outer tread surface will impart rotary motion to said rotary disk and thereby oppose the tension of said spring against said movement.

5. In a device of the type specified, a wheel body, including a central hub member arranged to be mounted on the axle of a vehicle, a rigid wheel rim, and rigid supporting members between said central hub member and said wheel rim, having in combination therewith a collapsible outer tread surface circumferentially surrounding said wheel rim, said outer tread surface consisting of a plurality of tread members, each of said tread members having one end pivotally secured to said wheel rim, the opposite or movable ends of said tread members passing through said wheel rim, the intermediate portions of said tread members projecting outwardly to form the said collapsible outer tread surface, and cushioning means for holding the members of said collapsible outer tread surface in operative resilient relation to said wheel rim, said means consisting of a metallic spring spirally disposed around said central hub member, one end of said spring secured to said central hub member and the opposite or movable end of said spring secured to a circular rotary disk, said disk mounted upon and arranged to have rotary motion around said central hub member, and a plurality of rigid connecting rods each having one end pivotally connected to the movable end of one of said tread members and their opposite ends all connected consecutively around the periphery of said rotary disk, in such manner and relation that any inward or collapsing movement of one or more of said tread members will impart rotary motion to said rotary disk, thereby causing all of said tread members to move in unison one with the other, and also oppose the tension of said spring against said movement.

6. In a device of the type specified, a wheel body, including a central hub member adapted to be mounted on the axle of a vehicle, a rigid wheel rim, and rigid supporting members between said central hub member and said wheel rim, having in combination therewith a collapsible outer tread surface, said collapsible outer tread surface consisting of a plurality of curved outwardly projecting tread members, each of said tread members having one end divided into two separate spaced apart arms, and pivotally secured, one arm on each side to said wheel rim, the intermediate portions of said tread members projecting outwardly from said wheel rim to form said collapsible outer tread surface, the opposite or movable ends of said tread members turning inwardly and passing through said wheel rim, said tread members mounted on said wheel rim in such manner that their movable ends will overlap and pass between the said spaced apart arms of the next succeeding tread members, and thence through said wheel rim, and cushioning means for holding said tread members in operative resilient relation to said wheel rim, said means including a metallic spring spirally disposed around said central hub member, one end of said spring secured to said wheel body, and the opposite or movable end of said spring connected to a circular rotary disk mounted upon and arranged to have rotary motion around said central hub member, and a plurality of connecting rods each having one end pivotally connected to the movable end of one of said tread members, and the opposite ends of said connecting rods pivotally connected to said rotary disk in such manner and relation that any inward or collapsing movement of said tread members will impart rotary motion to said rotary disk, and thereby oppose the tension of said spring against said movement.

7. In a device of the type specified, a wheel body, including a central hub member adapted to be mounted on the axle of a vehicle, a rigid wheel rim, rigid supporting members between said hub member and said wheel rim, and a collapsible outer tread surface circumferentially surrounding said wheel rim, said outer tread surface consisting of a plurality of tread members each of said tread members having one end pivotally secured to said wheel rim, the intermediate portions projecting outwardly from said wheel rim to form said collapsible outer tread surface, the opposite or movable ends turning inwardly and passing through said wheel rim, having in combination therewith a metallic spring spirally disposed around said central hub member, one end of said spring secured to said central hub member and the opposite or movable end of said spring connected to a circular rotary disk said disk mounted upon and arranged to have rotary motion around said central hub member, and means for connecting the movable ends of said tread members to said rotary disk said means including a plurality of rigid connecting rods each having one end pivotally secured to the movable end of one of said outer tread members, the opposite ends connected at spaced intervals, in sequence, around the periphery of said circular rotary disk, the point of said connection to said rotary disk, with said tread members in normal operative position, being offset from a line drawn between the wheel center and the tread member connection, of each respective connecting rod, and said connecting rods curved throughout their length the radius of said curve being such that at the maximum point of travel said connecting rods will fold without interference, one upon another around the periphery of said circular rotary disk and occupy a minimum of space thereon, to the effect that any inward or collapsing movement of said tread members will impart rotary motion to said rotary disk and oppose the tension of said spring against said movement.

8. In a device of the type specified, a wheel body, including a central hub member adapted to be mounted on the axle of a vehicle, a wheel rim, supporting members between said central hub member and said wheel rim, and an outer tread surface circumferentially surrounding said wheel rim, and capable of movement in relation to said rim, having in combination therewith a metallic spring spirally disposed around said central hub member, one end of said spring secured to said wheel body the opposite or movable end connected to a rotary disk, said rotary disk mounted upon and arranged to have rotary motion around said central hub member, and connecting rods interposed between said rotary disk and said outer tread surface in such manner and relation that any movement of said outer tread surface toward said wheel rim will impart rotary motion to said rotary disk and thereby oppose the tension of said spring against said movement.

9. In a device of the type specified, a wheel body, including a central hub member adapted to be mounted on the axle of a vehicle, a wheel rim, supporting members between said central hub member and said wheel rim, having in combination therewith a collapsible outer tread surface consisting of a plurality of curved outwardly projecting tread members, each of said tread members having one end pivotally secured to said wheel rim, the intermediate portion of said tread members projecting outwardly from said wheel rim to form said outer tread surface, their opposite or movable ends turning inwardly to and passing through said wheel rim, and cushioning means for holding said tread members in operative resilient relation to said wheel rim, said means including a metallic spring spirally disposed around said central hub member, one end of said spring secured to said wheel body and the opposite or movable end of said spring connected to a circular rotary disk said disk mounted upon and arranged to have rotary motion around said central hub member, and a plurality of connecting rods each having one end connected to the movable end of one of said tread members and the opposite end of said connecting rods pivotally connected to said rotary disk in such manner and relation thereto that any inward or collapsing movement of said tread members will impart rotary motion to said rotary disk and thereby oppose the tension of said spring against said movement.

10. In a device of the type specified, a wheel body including a central hub member adapted to be mounted upon the axle of a vehicle, a wheel rim, supporting members between said central hub member and said wheel rim, and an outer tread surface circumferentially surrounding said wheel rim, said tread surface capable of movement in relation to said wheel rim, having in combination therewith a rotary disk, said rotary disk mounted upon and arranged to have rotary motion around said central hub member, and a metallic spring connected to said wheel body and to said rotary disk, and means for connecting said rotary disk and said outer tread surface, said means including a plurality of connecting members arranged in such manner and relation that any movement of said outer tread surface toward said wheel rim will impart rotary motion to said rotary disk and thereby oppose the tension of said spring against said movement.

ARTHUR T. MALTBY.